United States Patent [19]

Colditz

[11] 4,127,870
[45] Nov. 28, 1978

[54] METHOD AND APPARATUS FOR CHANGING THE PICTURE POINT RESOLUTION OF CONTINUOUS TONE PICTURES DURING TRANSITION FROM REPRODUCTION TO RECORDING

[75] Inventor: Armin Colditz, Kiel-Wellsee, Germany

[73] Assignee: Dr. Ing. Rudolf Hell GmbH, Germany

[21] Appl. No.: 842,506

[22] Filed: Oct. 17, 1977

[30] Foreign Application Priority Data

Oct. 18, 1976 [DE] Fed. Rep. of Germany ....... 2646926

[51] Int. Cl.² .............................................. H04N 1/46
[52] U.S. Cl. ........................................ 358/77; 358/78
[58] Field of Search ............................ 358/75, 77, 78

[56] References Cited

U.S. PATENT DOCUMENTS

| 3,878,559 | 4/1975 | Pugsley | 358/78 |
| 3,944,726 | 3/1976 | Ito | 358/78 |
| 3,956,583 | 5/1976 | Pugsley | 358/78 |

*Primary Examiner*—Richard Murray
*Attorney, Agent, or Firm*—Hill, Gross, Simpson, Van Santen, Steadman, Chiara & Simpson

[57] ABSTRACT

Apparatus and method for changing the picture point resolution of color separations of continuous tone pictures in multicolor printing processes during transition from the scanning to reproduction in which the original picture is scanned and color separations are obtained from such scanning in the form of electronically stored digital recorded signals of particular raster points of a fine raster and are then converted into a printing raster wherein a raster system is used for printing which has different compression and extension of the distances of the printed raster points in the scan direction and in the direction at right angles to the scan direction, wherein the distances of the raster points in scan direction and the distances of the raster points at right angles to the scan direction have a ratio of integer numbers and wherein the fine raster is selected such that its raster line interval comprises a multiple of a common divisor of the length resulting from the projection of the printing raster on a line in scan direction or on a perpendicular line relative to the scan direction.

6 Claims, 11 Drawing Figures

METHOD AND APPARATUS FOR CHANGING THE PICTURE POINT RESOLUTION OF CONTINUOUS TONE PICTURES DURING TRANSITION FROM REPRODUCTION TO RECORDING

CROSS-REFERENCES TO RELATED APPLICATIONS

This application relates to co-pending application entitled "Method For The Rastered Reproducing Of Half-Tone Pictures Providing Changes In The Individual Picture Elements During Transfer From An Original To A Reproduction", Ser. No. 667,504, filed Mar. 17, 1976, now U.S. Pat. No. 4,075,663, Inventor Klaus Wellendorf, which is assigned to the assignee of the present application.

BACKGROUND OF THE INVENTION

1. Field of the Invention

This invention relates in general to methods of color reproducing copies of a colored master picture.

2. Description of the Prior Art

Reproducing color rasters for multicolor printing are known but many of such processes are very expensive and time consuming.

SUMMARY OF THE INVENTION

In co-pending U.S. Patent application Ser. No. 667,504, a method is described for the rastered reproduction of continuous tone pictures comprising changing a picture point resolution during transition from scanning to reproduction which allows possible a change or retention of the rastered dimensions while maintaining or changing the reproduction scale.

This method is very precise and utilizes a computer which interpolates from the four adjacent points pursuant to a change of the picture point separation and the outlay for the computer is justified in instances where extremely high reproduction quality is required.

However, under certain circumstances such extremely high quality is not required as for example in Gravure Printing wherein rastering four color separations in only two different screen rasters are accomplished. For example, magenta and yellow are printed in one screen raster and cyan and black are printed in the other screen raster. For this purpose, a special screen raster is employed which is suitable adapted for its raster geometry. This screen raster which is described herein in detail can be used in engraving machines for gravure printing cylinders wherein the original pictures are mounted on a rotating scanning cylinder and are scanned in a spiral manner with the pitch of the spiral paths in which the scanning device scans differs for the individual screen rasters. The recording of color separations as, for example, on printing cylinders is accomplished in the case of gravure printing machine of the "Helioklischograph" by an on-line engraving system which receives from the scanning head an analog scan signal on which a time or clock pulse which is the so-called raster clock pulse is superimposed which is different for both of the screen rasters and the engraving device provides recording only when a raster clock pulse is received thus forming the rastered printing form.

However, if it is desired to process the individual pictures between scanning and recording in digital form which is frequently desired at the present time in printing technology so as to carry out layout work or touch-up work this special raster is not suitable for digital processing.

Although it would be possible to use the methods described in application Ser. No. 667,504, in which the picture is scanned in a fine raster and processed and converted into desired screen rasters at a given time, such systems require a number of computing processes so as to accomplish this which requires considerable computer time and machine outlay.

According to the present invention, the object is to disclose a simplified method of changing the raster point separation of the picture information for printing techniques.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
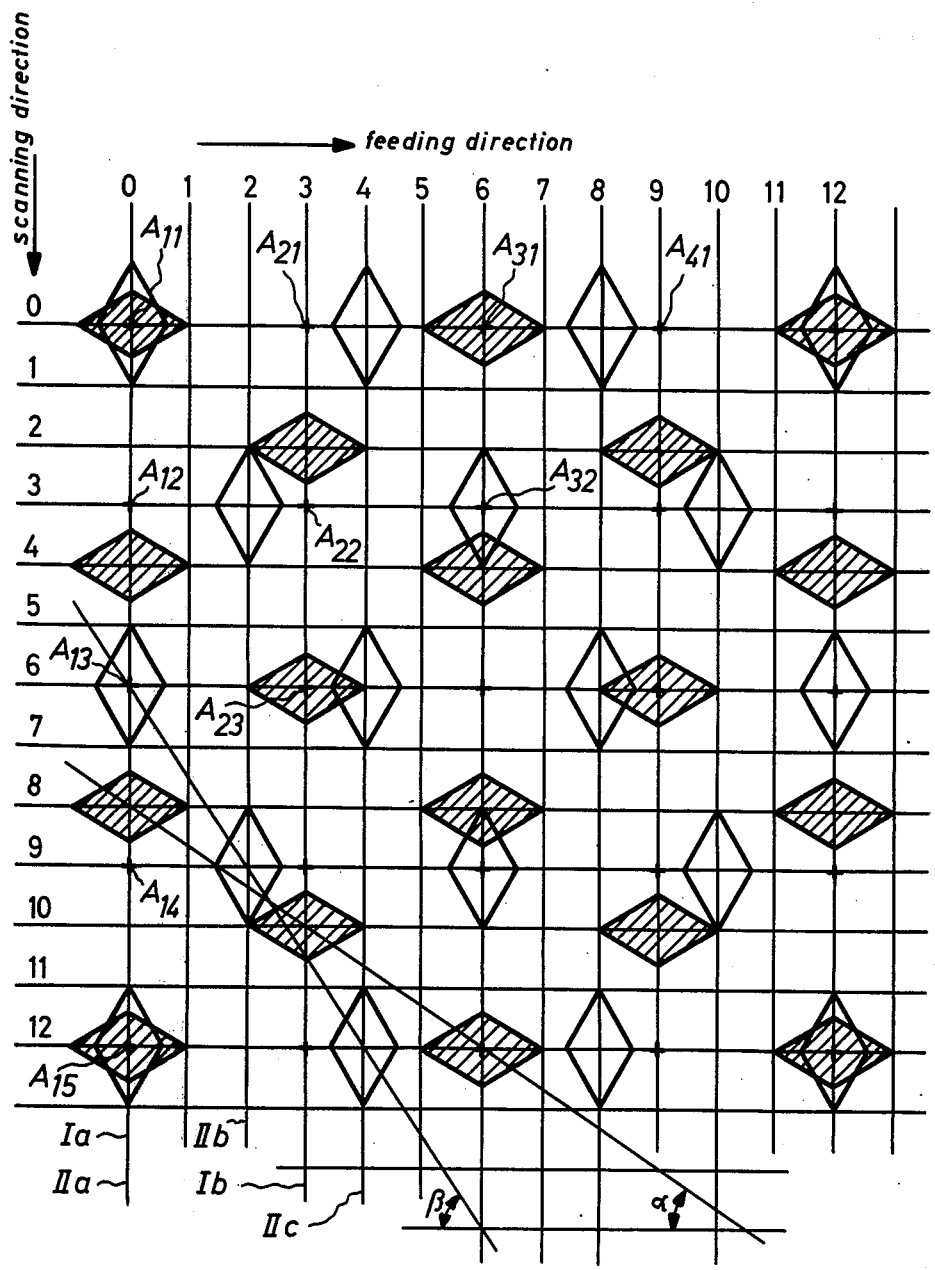
FIG. 1 is a view illustrating the screen raster system used in the invention.

FIG. 1 illustrates two printing screen rasters employed in the invention, one being shown with cross hatching and the other without cross hatching. For a better understanding, the coordinate lines 0, 1, 2, 3, 4, etc. are drawin in both the scan and feed direction illustrating both the projection of both screen rasters on the scan and in the feed directions. It is possible to conceive the screen raster provided with lines which are inclined at an angle $a$ relative to the feed direction as having originated in the following manner.

An orthogonal screen raster consisting of the intersecting points of coordinate lines 0, 5, 10 in the feed direction and 0, 5, 10 in the scan direction and in which it is assumed that such raster is to be compressed or shortened in the scan direction and expanded or extended in the feed direction. It is to be realized, of course, that the scan direction relates to the direction in which the scanning head of the scanning mechanism passes over the master drawing to be reproduced and the feed direction relates to the direction in which the cylinder upon which the master drawing is mounted is moved.

Secondly, a screen raster resulting from coordinate lines 2, 7, 12, 17 etc. in the feed or advance direction and coordinate lines 3, 8, 13, etc. in the scan direction formed by means of stretching or expanding is superimposed on the first screen raster. The second screen raster is displaced in both the scan and feed direction by half a raster point with regard to the first screen raster. The non-lined screen raster which is inclined relative to the feed or advance direction at an angle $\beta$ is assumed to be produced from the screen raster of the intersection points of lines 0, 5, 10 etc. and 0, 5, 10, etc. in the scan direction and recording directions by means of expansion in the scan direction and compressing in the feed or advance direction and by means of superimposing a similar screen raster displaced by half a raster point in each instance in the scan and feed directions.

In the present invention, a fine screen raster illustrated with crosses in FIG. 1 is placed in the network of the coordinate lines resulting from the projections as a consequence of which the feed or advance steps pursuant to a scanning of the original picture according to the fine screen raster are multiples of a common divider or divisor which results from the distances resulting from the projection of both printing rasters in the feed or advance direction. The spatial intervals between the raster points of the fine screen raster in the scan direction results in a similar fashion such that an orthogonal scanning screen raster is formed.

In the present invention, so as to provide as many raster points as possible for the printing screen raster to fall on the fine raster points and for the number of fine raster points to remain in acceptable boundaries, a screen raster interval was selected in the scan direction and feed or advance direction which represents four times the common divider or divisor.

If the feed or advance step is selected to be twice or three times the number of storage places required for the storage of the fine screen raster then the number of coincidences of the raster points with the printing screen raster will increase and in the case where the raster screen interval or spacing is made equal to the common divisor all of the raster points of the printing screen raster can be directly taken from the fine screen raster, a procedure which however, requires a very large storage capacity.

Figure 2:
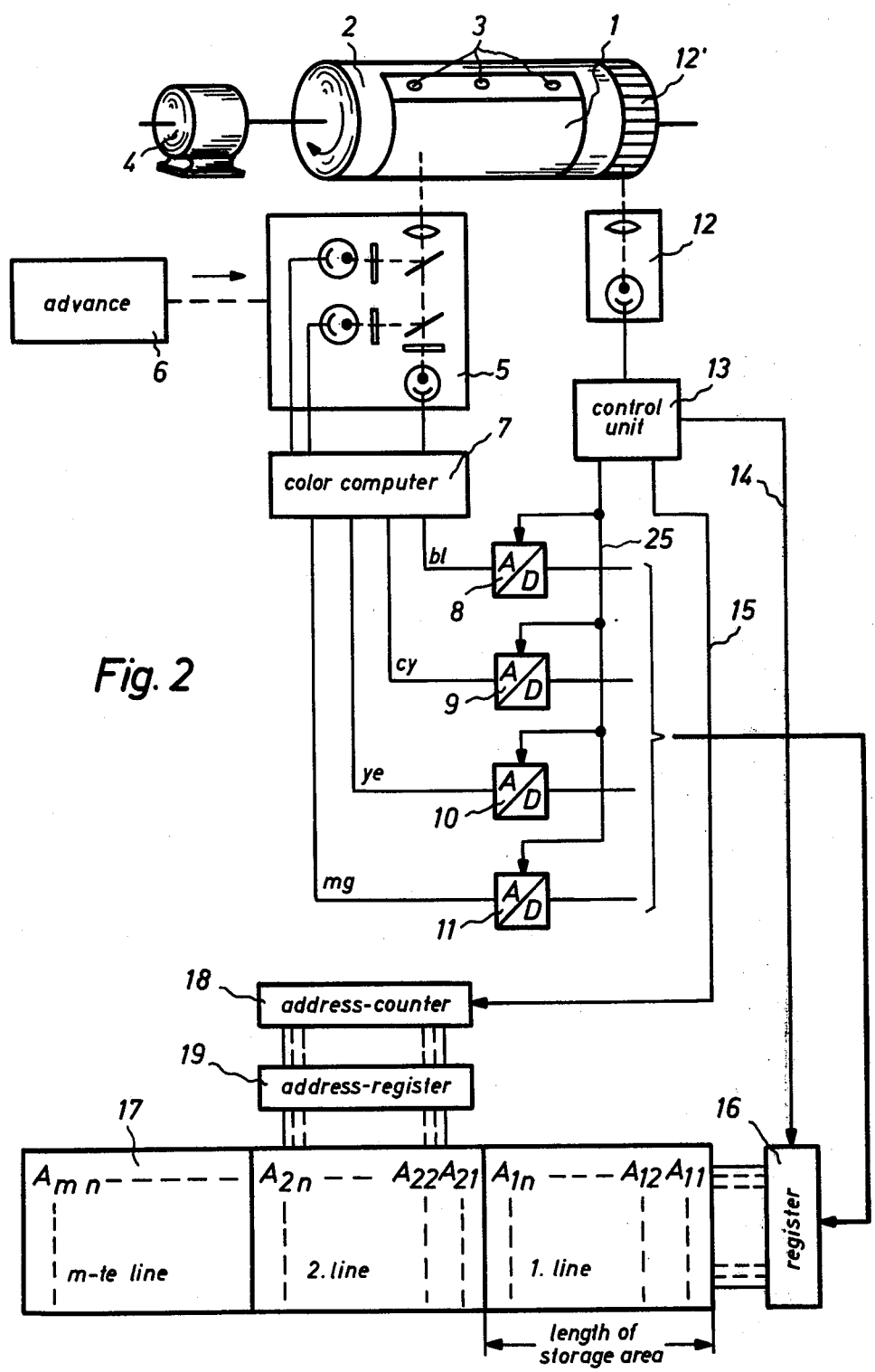
FIG. 2 is a basic block diagram illustrating the invention including the scanning means.

FIG. 2 illustrates a scanning apparatus for producing the fine screen raster and an original picture 1 to be reproduced is mounted on a rotating scanning cylinder 2 by means of registering pins 3. The cylinder is rotated by a motor 4. The picture original 1 is scanned by an electro-optical scanning head 5 which is axially moved back and forth along the cylinder by a feed or advance motion drive 6. The scanning head picks up the primary color measured value signals RGB of the original picture scan points which are supplied by the head 5 to a color computer 7. The color computer 7 transforms the primary color signals RGB into the printing color signals Magenta, yellow, cyan and black and corrects them in a known fashion. The color printing signals are each respectively supplied to analog to digital converters 8, 9, 10 and 11 in which they are converted into digitalized signals with the aid of a clock pulse signal sequence arriving through a clock control unit 13 which receives an input from an impulse generator 12 which is mounted adjacent the cylinder 2. The clock pulse sequence produced by impulse generator 12 and the feed or advancement of the scanning head 5 are dimensioned such that the raster intervals shown in FIG. 1 for the fine screen raster illustrated in the form of crosses result. This is achieved by dividing a raster foil sheet 12' into a plurality of incremental divisional steps and by a suitable setting of the feed or advancement in the feed or advancement installation 6.

Since the digital scanning data of the fine screen raster are to be stored they are provided to an input register 17 of a memory 17 through a multiple bus line. Storage signals proceed in image line fashion in which each scanning point of a picture line is placed under a particular address which is adjusted from the scanning by way of a clock pulse line 15 which is supplied to an address counter 18 and is fed to the memory 17 through an address register 19. The address counter 18 is controlled by a clock pulse sequence arriving from clock pulse control unit 13. All four color data signals, black, cyan, yellow and magenta are placed under the address of one picture point. In the example of FIG. 2, the first picture lines are referenced as $A_{11}, A_{12}, A_{13}, A_{14}...A_{1n}$; the second picture line are referenced as $A_{21}, A_{22}...A_{2n}$, and so forth. The picture lines lie in succession in the memory so that they can be read out in succession for a subsequent digital processing. Additionally, it should be noted that the clock pulses of the address counter 18 and of the input register 16 are delayed in the clock pulse control unit 13 in a known fashion corresponding to the signal transmit times.

Figure 3:
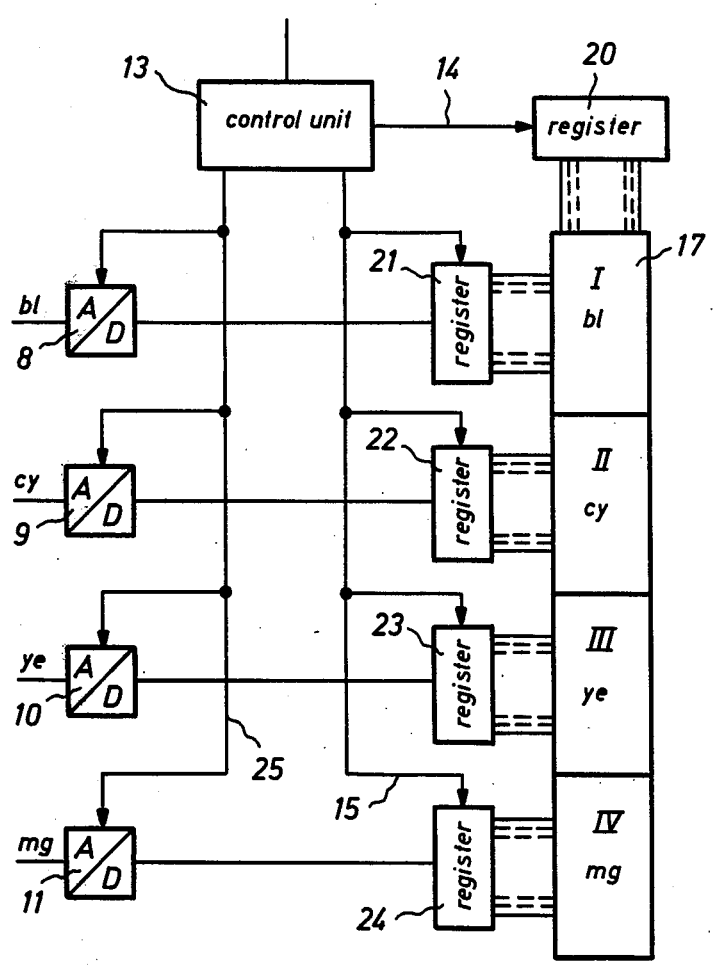
FIG. 3 illustrates a modification of the invention for storing the fine screen raster in discreet storage regions.

The memory can also be organized in a different manner as illustrated, for example, in FIG. 3. In this sample embodiment, the color signals are placed in a color separation fashion in discreet storage regions I, II, III and IV. This is accomplished through a direct input into these storage regions with the aid of input registers 21, 22, 23 and 24 which are connected to the output side of the analog to digital converters 8, 9, 10 and 11 and also are connected to an address counter 20. The analog to digital converters 8, 9, 10 and 11 are controlled by the clock pulse signal on line 25 and the input registers 21, 22 and 23 and 24 are controlled by the clock pulse signal on line 15 which is delayed relative to the clock pulse signal on line 25 by only one clock pulse.

Figure 4:
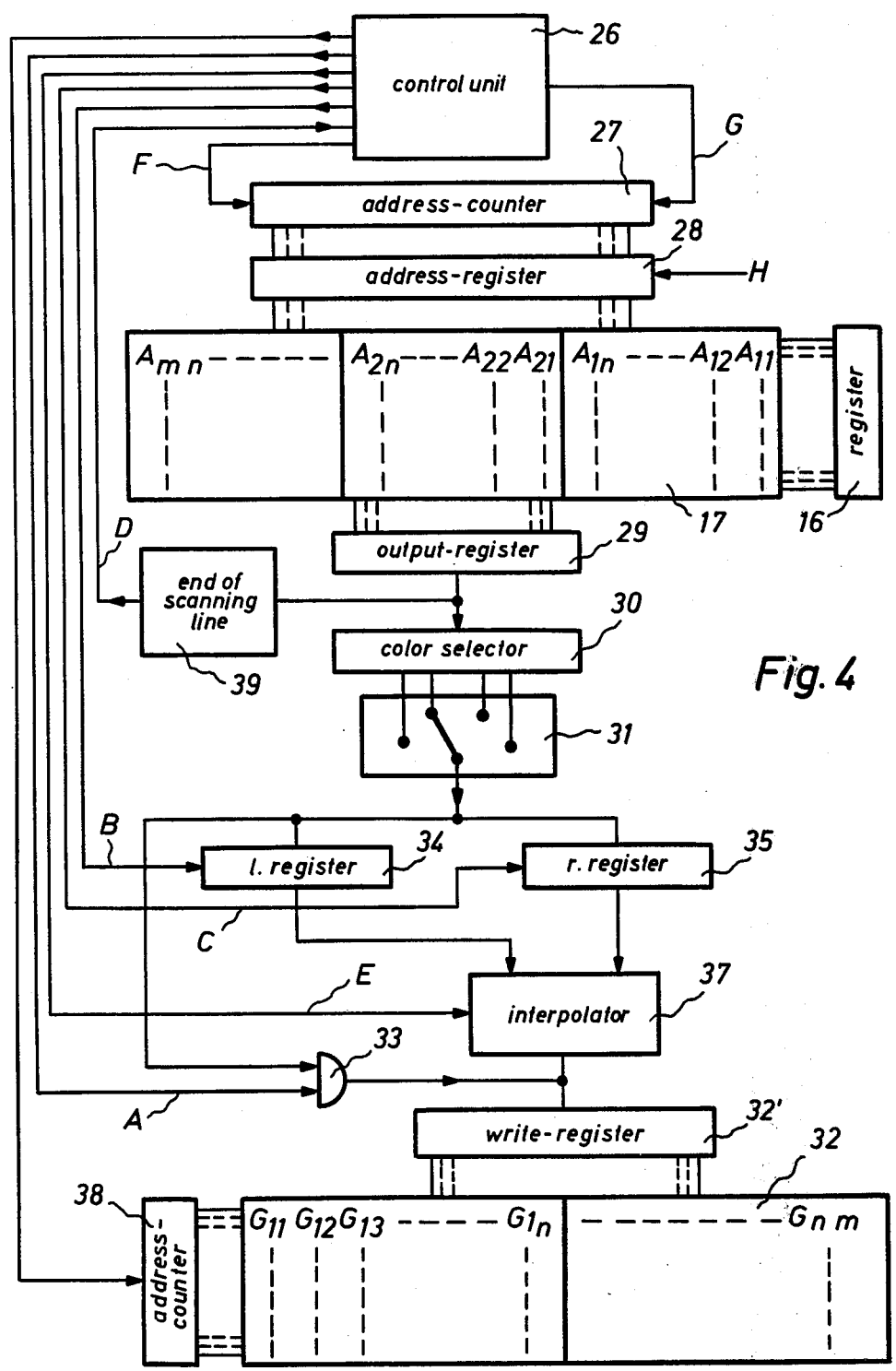
FIG. 4 is a block diagram illustrating a circuit arrangement for producing the print screen raster.

FIG. 4 indicates a basic circuit diagram for the conversion of the fine screen raster into the printing screen rasters. The successive picture lines $A_{11}, A_{12}...A_{1n}$ are placed in the memory 17. This can be the memory 17 illustrated in FIG. 2, however it can also be another form of the memory into which the picture data of the fine screen raster are of one or more picture or text portions have been placed after further processing. A control unit 26 supplies the data of the individual picture points in a scan line fashion into an output register 29 through an address counter 27 and an address register 28. Connected to the output side of output register 29 is a color selector 30 which provides a separation of the coded signals of a raster point according to color. A color separation switch 31 determines which color separation is to be processed at a particular instant.

The raster points of the printing screen rasters are determined from the fine screen raster picture point by point along a scan line. For this purpose, the control unit 26 determines that in case a printing screen raster point agrees or coincides with a fine screen raster point, the latter is directly provided in the engraved line memory 32. In order to accomplish this AND gate 33 is connected to the output of the color separation switch 31 and also receives an input from the control unit 26 so as to provide for the direct take-over of this raster point into a writein register 32' of the memory 32. If a raster point of the printing screen raster does not lie on a scan point of the fine screen raster both adjacent scan points of the fine screen raster are used to interpolate. For this purpose the two adjacent raster points of the fine screen raster are read from the memory 17 and provided to registers 34 and 35 which are designated as the left and right register respectively. Connected to the output side of registers 34 and 35 is an interpolator 37 in which a corresponding value is determined in a known manner from the two outputs of the registers 34 and 35. In the present inventon, the nearest raster point is evaluated with one-third and the distant raster point with two-thirds. Input of the raster points in the registers 34 and 35 as well as interpolation and take over of a raster point are accomplished by means of commands provided by the control unit 26.

The takeover of the raster point values of the printing screen raster into memory 32 proceeds by a means of a write-in register 32' and an address counter 38 actuated by the control unit 26.

So that at the end of a scan line a relay forward switching advance to the following scan line occurs a scan line decoder 39 is provided which is connected to supply an input to the control unit 26 where it is converted into an address switch-over impulse F and conveyed to an address counter 27.

So as to clarify the following explanation of the control unit 26 the following references for the clock pulses and commands will be utilized:

A — Takeover picture points of the fine screen raster.
B — Fill left register 34
C — Fill right register 35
D — End of picture line
E — Interpolate an interpolator 37
F — Advance forward switch address on address counter 27
G — Clock pulse
H — Switch over address register 28

Figure 5:
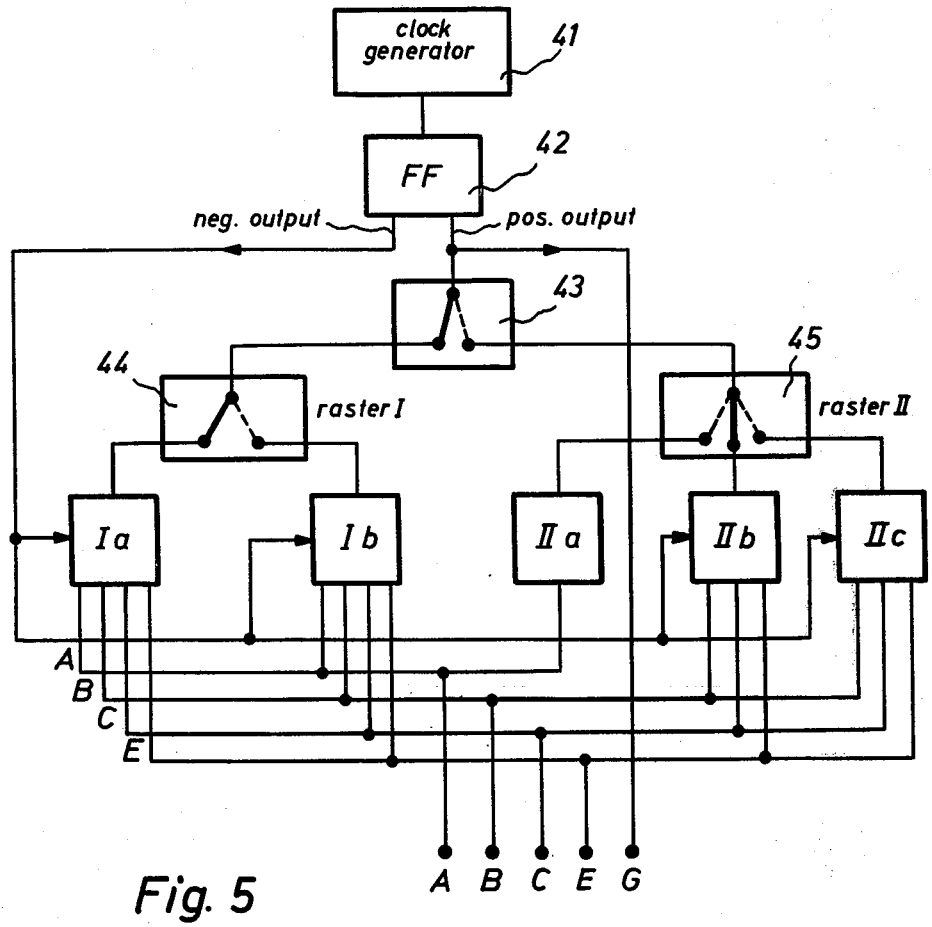
FIG. 5 is a schematic view of the control unit illustrated in FIG. 4.

FIG. 5 illustrates the control unit 26 in detail. It consists of a clock pulse generator 41 which provides an output clock pulse signal to dividing or step down unit 42 which is in the form of a flipflop with positive and negative outputs. The positive divided pulse sequence is supplied to a printing screen raster changeover switch 43 in which an adjustment or positioning is effected as to which of the two printing screen rasters illustrated in FIG. 1 are being processed with the compressed or shortened raster being referenced with I and the expanded or elongated raster being referenced as II. If it is assumed that the switch is in the position in which the raster I is being processed and as can be observed from FIG. 1 in the case of raster I with reference to the fine screen raster only two discreet raster point sequences or trains Ia and Ib occur in the scan direction and they alternate with respect to each other. Since these two sequence trains Ia and Ib are different, a changeover switch 44 is connected to switch 43 and switches over between these two picture lines depending upon the picture line impulse D arriving from scan line end decoder 39. For raster II, the frequency of the raster point sequences is 3 and thus it is necessary to differentiate three discreet picture lines IIa, IIb and IIc. A switch 45 is connected to switch 43 and is utilized for processing the picture lines IIa, IIb and IIc.

Connected to the outputs of the picture line changeover switches 44 and 45, are the control circuits Ia, Ib for raster I and the control circuits IIa, IIb and IIc for a raster II for the purpose of determining the printing screen raster points. As is illustrated in FIG. 5, the control units Ia, Ib, IIb and IIc transmit command signals A, B, C and E, which control the takeover or interpolation of the raster points from the fine screen raster into the printing screen raster. These control circuits are illustrated and will be explained in further detail with reference to FIGS. 7 through 11.

Figure 6:
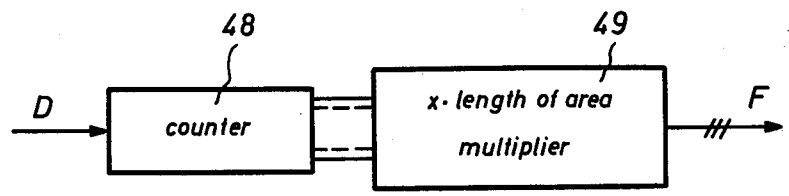
FIG. 6 illustrates a circuit for address selection of the storage device for continuous picture lines.

FIG. 6 illustrates a circuit for obtaining the data for the address relaying or advance switching of the address counter 27 illustrated in FIG. 4 during transition from one picture line to the other. The picture line end impulse D supplied by the decoder 39 of FIG. 4 is supplied to a scan line counter ALZ 48 which provides an output to a multiplier unit 49 which multiplies the scan line number resulting from the counter 48 with the storage field length and, thus, delivers at the output a magnitude signal F which advances the address counters by the number of addresses of one picture line when the picture line counter has advanced. F is the storage field length, in other words, the length of the longest picture line for which the storage regions are dimensioned.

Figure 7:
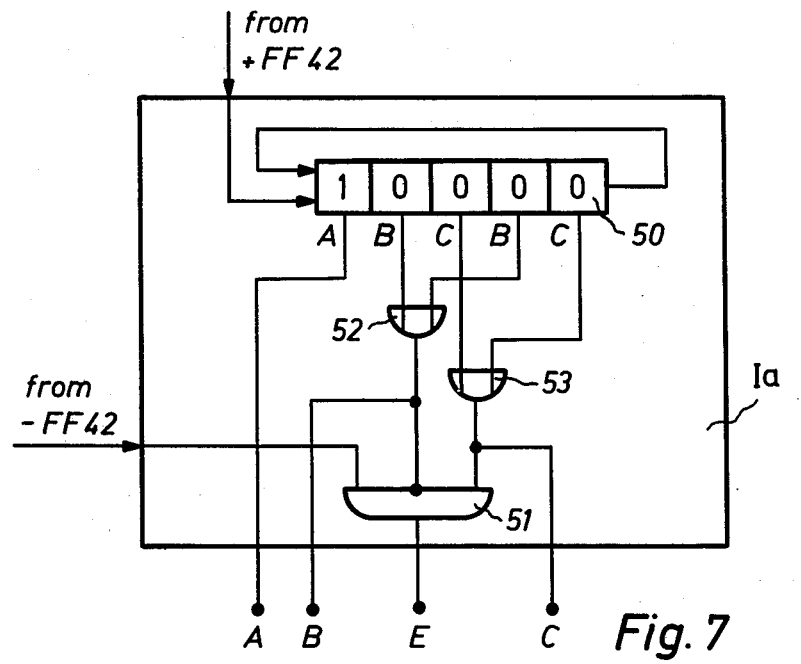
FIG. 7 is a block diagram of stage I$a$ illustrated in FIG. 5.

FIG. 7 illustrates the control unit Ia of FIG. 5 in further detail. For picture line Ia the following is valid:

$A_{11} = G_{11}$ $A_{12}/A_{13} = G_{12}$ (the line between $A_{12}$ and $A_{13}$ denotes "interpolate")

$A_{13}/A_{14} = G_{13}$ etc.

The values $A_{11}$, $A_{12}$, $A_{13}$, $A_{14}$ represent the raster points of the picture line Ia of the fine screen raster as they are stored in memory 17 and these can be readily observed in FIG. 1 by means of the reference lines.

$A_{11}$ — intersection point of auxiliary lines 0/0
$A_{12}$ — intersection point of auxiliary lines 3/0
$A_{13}$ — intersection point of auxiliary lines 6/0
$A_{14}$ — intersection point of auxiliary lines 9/0

$G_{11}$ and $G_{12}$ denote the raster points of the first engraved line of printing raster I as they are placed in memory 32.

Control circuit Ia contains a feedback or regenerator five stage shift register 50 which with each clock pulse is advanced one stage. By way of the shifting clock pulse from the plus output of flip-flop 42 a "1" is transmitted from the end of the shift register into the first stage of the shift register which acts upon AND gate 33 as a through-put command A. By means of the first clock pulse G, the first raster point $A_{11}$ is recalled and supplied to the output register and passes through the color selector 30 and the color selection switches 31 reaches the AND gate 33.

The second clock pulse calls up by way of address counter 27 picture points $A_{12}$ of the fine screen raster and delivers command B, which is fill left register 34 with $A_{12}$. The third clock pulse calls up raster point $A_{13}$ of the fine screen raster and produces a command C; which is fill right register 35 with $A_{13}$.

The outputs of stages 2 and 3 are interconnected through AND gate 51 which in addition receives a negative clock pulse from flip-flop 42. The output pulse of the AND gate 51 E activates interpolator 37 and interpolates the value $G_{12}$ from the values $A_{12}$ and $A_{13}$. The B input of the AND gate 51 is inverted in order that the gate switches for B and C during the combination 0/1.

The third shifter clock pulse calls up a storer or memory $A_{13}$ and in the third stage delivers the signal B which is fill left register with $A_{13}$. The next clock pulse delivers to stage 4 of the shift register the signal C which is fill right register with raster point $A_{14}$ which has been called up by this clock pulse. The outputs 4 and 5 of the shift register pass through OR gates 52 and 53 to the B and C inputs of gate 51 and produce an E signal which is interpolate $A_{13}$ and $A_{14}$ to $G_{13}$. This is continued until picture line $Ia$ has been processed until the end of the line.

Figure 8:
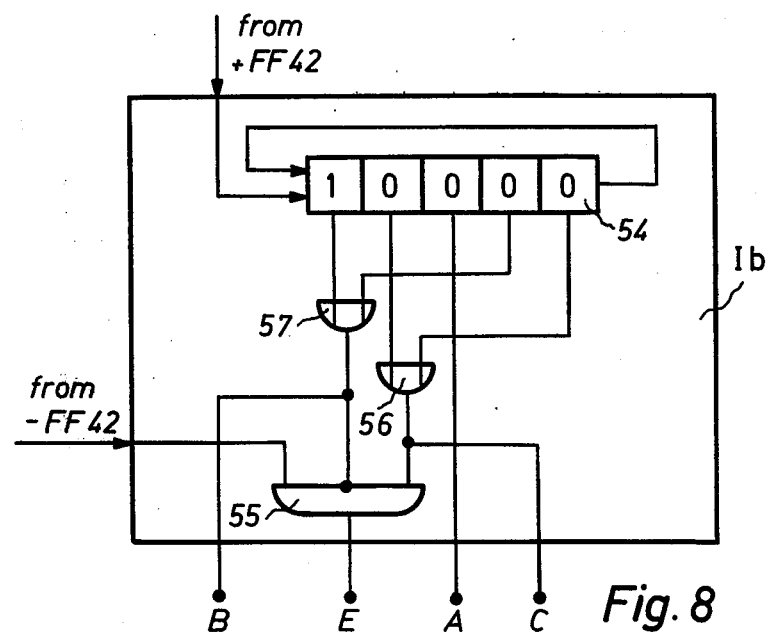
FIG. 8 is a block diagram of stage I$b$ illustrated in FIG. 5.

Through image line clock pulse G the stage $Ib$ of FIG. 5 is switched on which is illustrated in greater detail in FIG. 8. This stage $Ib$ is similar to stage $Ia$ and must meet the following requirements:

$A_{21}/A_{22} = G_{21}$ $A_{23} = G_{22}$ $A_{24}/A_{25} = G_{23}$ whereby the engraved picture line $Ib$ of raster I is produced.

From FIG. 1, it is apparent that for the value $G_{21}$ value $A_{21}$ and $A_{22}$ of the fine screen raster must be interpolated in the following manner.

1. Shifter clock pulse — command B — fill left register.
2. Shifter clock pulse — command C — fill right register.

A and B are brought together with the negative clock pulse of flip-flop 42 through AND gate 55 with the input B being inverted so that the 01 condition is valid for B and C. The AND gate 55 produces the command E — interpolate so that the values $A_{21}$ and $A_{22}$ input into the left or right register by B and C are interpolated to obtain $G_{21}$. The next clock pulse delivers the command "takeover A" which inputs the raster point $A_{23}$ called up from the address counter by this clock pulse into the engraving memory without interpolation. The outputs of stages 4 and 5 are connected through OR gates 56 and 57 to the B and C inputs of the AND gate 55 as a consequence of which the interpolation command F is produced and the interpolation product $G_{23}$ is transmitted to the engraving memory. The process is repeated until the picture line $Ib$ has been completed.

Figure 9:
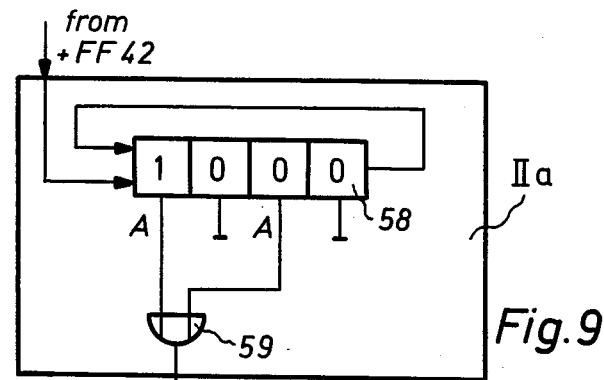
FIG. 9 illustrates stage II$a$ in FIG. 5.

Subsequently, a switching over is effected to raster II, and the raster line $IIa$ is first processed. According to FIG. 1, the following applies to $IIa$:

$A_{11} = G_{11}$ $A_{12}$ is eliminated $A_{13} = A_{12}$ $A_{14}$ is eliminated FIG. 9 illustrates the circuit which accomplishes this. Stage $IIa$ contains a four stage feedback shift register 58. The first clock pulse delivers command A which is takeover $A_{11}$ which has been called up from the address counter 27. The second clock pulse is eliminated and the third clock pulse again delivers the command "A" which causes the value $A_{13}$ to be called up by this clock pulse and is taken over into the engraved line memory 32. The commands "A" which have been produced by the first and third clock signals are supplied to the gate 33 illustrated in FIG. 4 through the OR gate 59. The fourth clock pulse is again eliminated in other words, no take over of $A_{14}$. This cycle is repeated to the end of the picture line of $IIa$. Subsequently, switch over is effected to $IIb$ and the following applies to picture line $IIb$.

Figure 10:
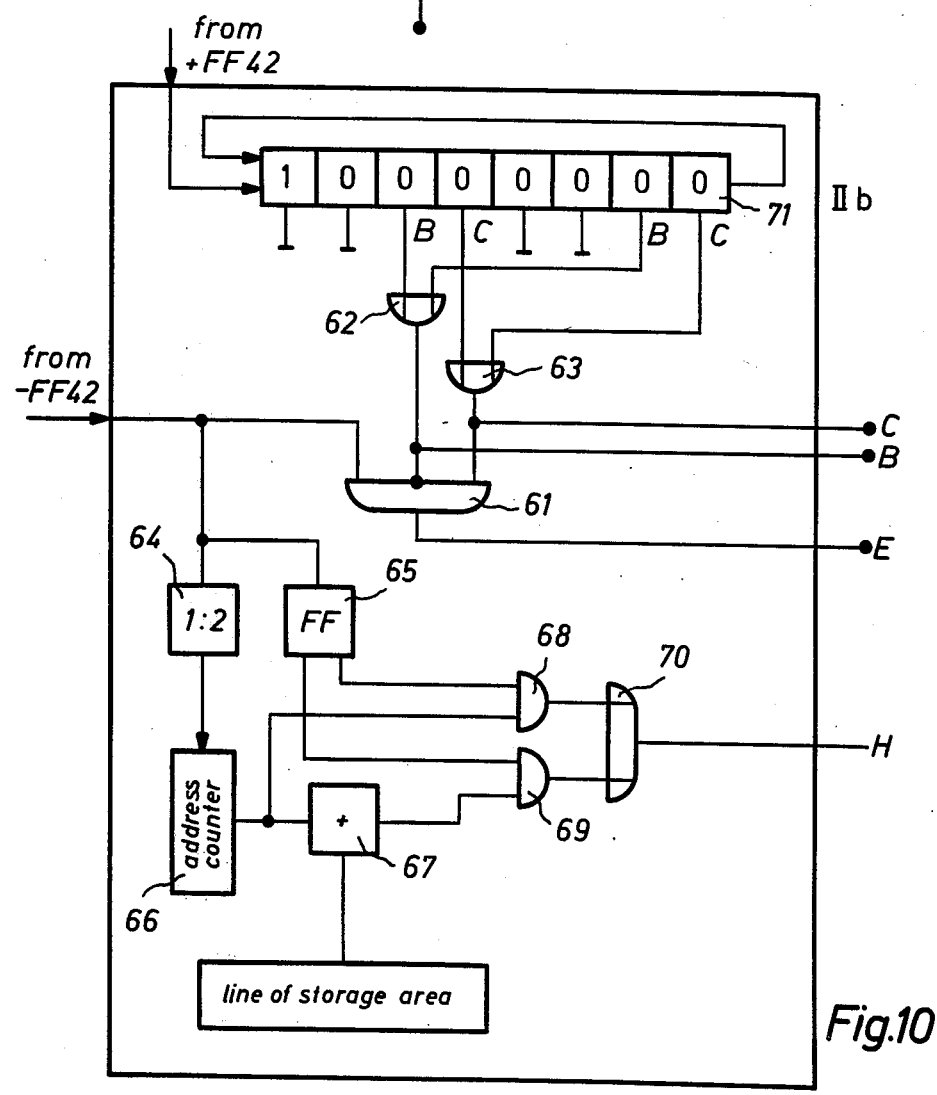
FIG. 10 illustrates an example of stage II$b$ in FIG. 5.
Figure 11:
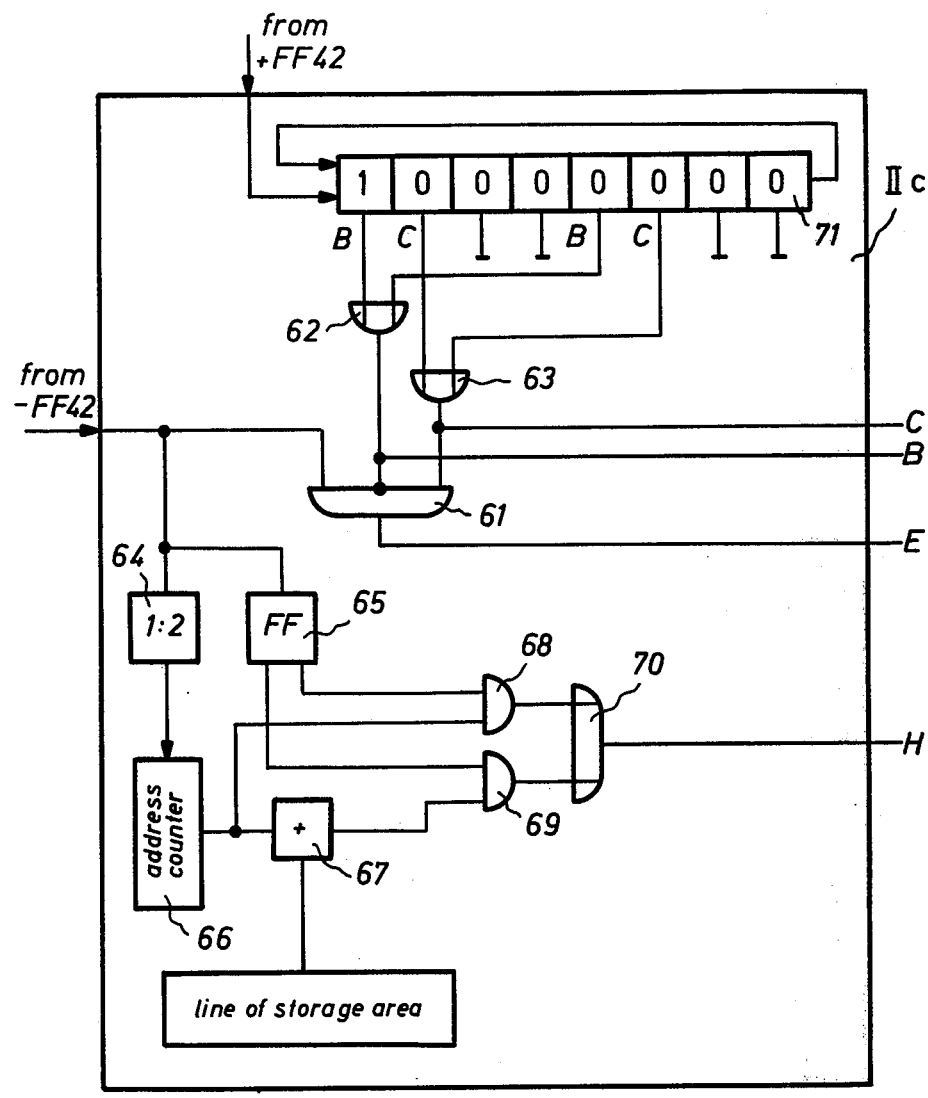
FIG. 11 illustrates an example of stage II$c$ in FIG. 5.

$A_{11}/A_{21}$ is eliminated $A_{12}/A_{22} = G_{21}$ $A_{13}/A_{23}$ is eliminated $A_{14}/A_{24} = G_{22}$ This is accomplished with the circuit illustrated in FIG. 10. In FIG. 10, an 8 stage shift register 71 is provided in which the first two shifter clock pulses are eliminated. The third clock pulse delivers the command "B" and the fourth delivers the command "C" and these signals together produce the signal E through an AND gate 61 and a negative output of the flip-flop 42. Signal E actuates the interpolator 37. The signals B and C which had called up the raster points $A_{12}$ and $A_{22}$ and conveyed them to registers 34 and 35 with raster points are then converted by interpolation to $G_{21}$. The next two clock pulses are again eliminated and clock pulses 7 and 8 proceed through OR gates 62 and 63 to the B and C inputs of gate 61. The B input of gate 61 inverts since the combination 01 for B, C is to be transmitted.

The difference of these stages as compared with the earlier ones consists in that raster points of two discreet scan lines of the fine screen raster are utilized for the purpose of interpolation. For this purpose, it is necessary during the call up of the addresses of these raster points in memory 17 to jump or skip between two picture lines. In stage 10 illustrated in FIG. 10 therefore there is provided a corresponding address control unit which applies the address values "H" alternately to the address values "G" which are called up from the control unit by the normal clock pulse. The negative clock pulse of the flip-flop 42 is subdivided in the ratio of 1:2 in divider stage 64, however, before this is accomplished it controls a flip-flop 65 so that it produces two outputs. The subdivided clock pulse from divider 64 is transmitted to a separate address counter 66 which provides an output to the adder unit 67 which also receives an output of a storage memory field line 90. The adder adds these two input signals. The output of the address counter 66 is also supplied to an AND gate 68 and the value increased by the storage field length is transmitted to another AND gate 69 from the adder 67. Both of the AND gates 68 and 69 are operated by the separate outputs of flip-flop 65 and thus alternately deliver the low and high address values. These two values pass through an OR gate 70 and are employed in the form of an H signal value for the purpose of switching over the address register 28. Thus, at one time it is possible to call up with a low address a scan point of an image line and with a higher address to call up the stored image point of the next scan line which has been displaced in the memory by one picture line.

After picture line $IIb$ has been processed to the completion of the line, image line $IIc$ is commenced. The following is valid for this process: (Shown in FIG. 11)

$A_{21}/A_{31} = G_{31}$ $A_{22}/A_{32}$ is eliminated $A_{23}/A_{33} = G_{32}$ $A_{24}/A_{34}$ is eliminated It is apparent that this is the reversal of the function of stage illustrated in FIG. 10 and the shift registers 1 and 2 are exchanged for 3 and 4 of register 71 and the output of stages 5 and 6 are exchanged for those of the stages 7 and 8. The commands B, C and E will appear at the output however at different time points particularly with the first and second clock pulses and the third and fourth clock pulses and the interpolation proceeds in each instance between the first and the second as well as the third and the fourth clock pulses.

The alternating address switchover process is precisely as in FIG. 10 and the mode of operation will not be repeated for this reason.

Although the invention has been described with respect to preferred embodiments, it is not to be so limited as changes and modifications may be made which are within the full intended scope as defined by the appended claims.

I claim as my invention:

1. A method for changing the picture point resolution of color separations of continuous tone pictures in multicolor printing processes during transition from the scanning to reproduction in which the original picture is scanned and color separations are obtained from such scanning in the form of electronically stored digital recorded signals of particular raster points of a fine raster and are then converted into a printing raster wherein a raster system is used for printing which has different compression and extension of the distances of the printed raster points in the scan direction and in the direction at right angles to the scan direction, wherein the distances of the raster points in scan direction and the distances of the raster points at right angles to the scan direction have a ratio of integer numbers and wherein the fine raster is selected such that its raster line interval comprises a multiple of a common divisor of the length resulting from the projection of the printing raster on a line in scan direction or on a perpendicular line relative to the scan direction.

2. The method according to claim 1, wherein the raster points of the printing raster are selected from the fine raster.

3. The method according to claim 1, wherein the raster points of the printing raster if they coincide with the fine raster are assumed by the fine raster and wherein the raster points of the printing raster in the event that they do not fall on the raster points of the fine raster are obtained by interpolation of adjacent raster points of the fine raster.

4. The method of changing the picture-point-resolution of color separations of continuous tone pictures in multicolor printing the scanning of the original and reproduction, wherein, from an original picture color separations are obtained in the form of electronically stored digital recording data of raster points of a fine screen raster, and then converted into a printing screen raster, wherein:

A. A raster system is employed for the printing screen raster consisting of two printing screen rasters which are derived from a raster which is orthogonal and extends in the scan direction, whereby the first printing screen raster is obtained,
 a. the step of compressing the orthogonal raster in scan direction,
 b. the step of elongating the orthogonal raster in a direction at right angles to the scan direction, and
 c. the step of respectively superpositioning the compressed and elongated raster with a similarly compressed and extended raster of equal raster width which has been displaced by half a raster interval in the scan direction, and wherein the second raster is obtained,
 d. the step of elongating the orthogonal raster in scan direction,
 e. and the step of compressing the orthogonal raster in the direction at right angles to the scan direction, and
 f. the step of respectively superpositioning the compressed and elongated raster with a similarly shortened and extended raster of equal raster width which has been displaced by half a raster interval in the scan direction, B. and wherein the fine screen raster is selected such that its raster line intervals are a multiple of a common divisor of the lengths resulting from the projection of the printing screen rasters in the scan direction, or on a perpendicular line relative to the scan direction in the feed or advance direction, C. and wherein the raster points of the printing screen raster in the event that they coincide with the fine raster, are assumed by the fine raster, and wherein D. the raster points of the printing screen raster which do not fall on raster points of the fine raster are obtained by interpolating from the closest two adjacent raster points of the fine raster.

5. The method according to claim 4 wherein the elongating of the first printing raster in the scan and feed or advance directions correspond to the elongating of the other printing raster in the feed or scan direction.

6. Apparatus for changing the picture points resolution of continuous tone pictures comprising, means for electro-optically scanning an original picture to obtain a picture signal, means for periodically advancing said picture relative to said scanning means, said electro-optical scanning means separating said picture signal into a plurality of color component signals, a plurality of analog to digital converters receiving the color component signals from said separating means, a memory receiving the outputs of said analog to digital converters and storing said color component signals, reproducing means for reproducing printing screen rasters from said data stored in said memory wherein one of said printing rasters is contracted in the scan direction and expanded in the feed direction and the other printing screen raster is similarly contracted and expanded as the first one and displaced by one half single raster interval and wherein the fine screen raster is selected such that its raster line intervals are a multiple of a common divisor of the lengths resulting from projection of the printing screen rasters in the scan direction, and wherein the raster points of the printing screen raster in the event they coincide with the fine raster are assumed by the fine screen raster, in the event said points do not coincide they are interpolated from the nearest points of printing screen raster.

* * * * *